United States Patent [19]

Blissett et al.

[11] Patent Number: 5,053,876

[45] Date of Patent: Oct. 1, 1991

[54] IMAGE STABILIZATION

[75] Inventors: Rodney J. Blissett, Romsey; Martin Collar, Andover, both of United Kingdom

[73] Assignee: Roke Manor Research Limited, Romsey, England

[21] Appl. No.: 465,134

[22] PCT Filed: Jun. 30, 1989

[86] PCT No.: PCT/GB89/00742

§ 371 Date: Apr. 30, 1990

§ 102(e) Date: Apr. 30, 1990

[87] PCT Pub. No.: WO90/00334

PCT Pub. Date: Jan. 11, 1990

[30] Foreign Application Priority Data

Jul. 1, 1988 [GB] United Kingdom ............... 8815714

[51] Int. Cl.$^5$ ............................................. H04N 7/18
[52] U.S. Cl. .................................. 358/222; 358/105; 358/126
[58] Field of Search ............... 358/222, 126, 125, 105, 358/107

[56] References Cited

U.S. PATENT DOCUMENTS 4,612,575 9/1986 Ishman et al. ..................... 358/222
4,692,806 9/1987 Anderson et al. .............. 358/126 X
4,709,264 11/1987 Tamura et al. ................. 358/222 X
4,823,194 4/1989 Mishima et al. ................ 358/125 X

FOREIGN PATENT DOCUMENTS 63-166370 7/1988 Japan.
2116397 9/1983 United Kingdom.
2165417 4/1986 United Kingdom.

OTHER PUBLICATIONS

"A New Technique to Improve Video Stability by Digital Processing"; SMPTE Journal, vol. 97, #11; Nov. '88; Matsuzuru et al.
129th SMPTE Technical Conference in L.A., Nov. '87; Matsuzuru et al.

Primary Examiner—Victor R. Kostak
Attorney, Agent, or Firm—Fleit, Jacobson, Cohn, Price, Holman & Stern

[57] ABSTRACT

A method of and apparatus for electronically stabilizing incoming video data against unwanted or undesirable sensor movement. By digitizing each or selected pixels of a frame, and comparing them against stored values of the pixels, image movement and sensor movement can be detected. The frame can then be remapped to provide no or only wanted movement of the image, e.g., in panning or in image following, and the processed video data can then be fed to a video recorder or monitor.

12 Claims, 1 Drawing Sheet

+ LOCATION OF TRACKED PIXEL

— PIXEL DISPLACEMENT SINCE LAST FRAME

IMAGE STABILIZATION

FIELD OF THE INVENTION

This invention concerns image stabilisation particularly, but not exclusively, the stabilisation of TV camera images.

Many circumstances arise in which the quality of video data is impaired. For example, a TV camera may suffer from unstable pointing if the camera is hand-held, or is rigidly mounted on a moving platform, for example, a vehicle such as a vessel or aircraft. The problem is aggravated if a long focal length lens is used to form the image. Generally, it is not possible to repeat the data gathering exercise if it is subsequently found that the data, e.g. on a video recording, is impaired in this way.

DESCRIPTION OF RELATED ART

The conventional solution of this problem is to increase the inertia of the sensor so as naturally to dampen any motion of the sensor (for example, electronic news gathering cameras) due to hand pointing. This solution does not guarantee stability if the data is acquired from a moving platform. A better solution, albeit more expensive, relies on inertially stabilising the camera by mounting the latter on a gyroscopically stabilised platform e.g. a "STEADY SCOPE" (trade mark) mounting platform. Devices of this type have been widely used in aerial surveillance but possess certain disadvantages. If the camera is directed at a moving object and panned to follow the object, the gyroscopes precess and the resultant video image is no longer centred on the object of interest. Further, the time response of the mounting platform will not necessarily be tuned to the pointing fluctuations of the camera. Neither of the present solutions enable correction of already generated video data, for example, that recorded on video tape.

It is an object of the present invention to provide a method and apparatus wherein the aforesaid disadvantages are overcome.

SUMMARY OF THE INVENTION

According to the present invention, there is provided an electronic image stabilisation apparatus comprising converter means for digitising a video signal to be stabilised, a framestore for storing digital information relating to at least two frames, window defining means, means for identifying at least one specific pixel within the or each window, means for comparing the location of the or each pixel in succeeding frames and for remapping the frame to cancel a detected movement vector.

The invention also provides a method of electronic image stabilisation comprising the steps of digitising an analogue video signal into pixels, defining within each frame at least one window, storing the value and location of at least one pixel within the or each window of a first frame, comparing the position of the at least one pixel in a next succeeding frame with the stored value, and remapping the frame to cancel a vector defining detected movement between the pixel location.

The invention will be described further, by way of example, with reference to accompanying drawings, in which:

DESCRIPTION OF THE PREFERRED EMBODIMENTS

Figure 1:
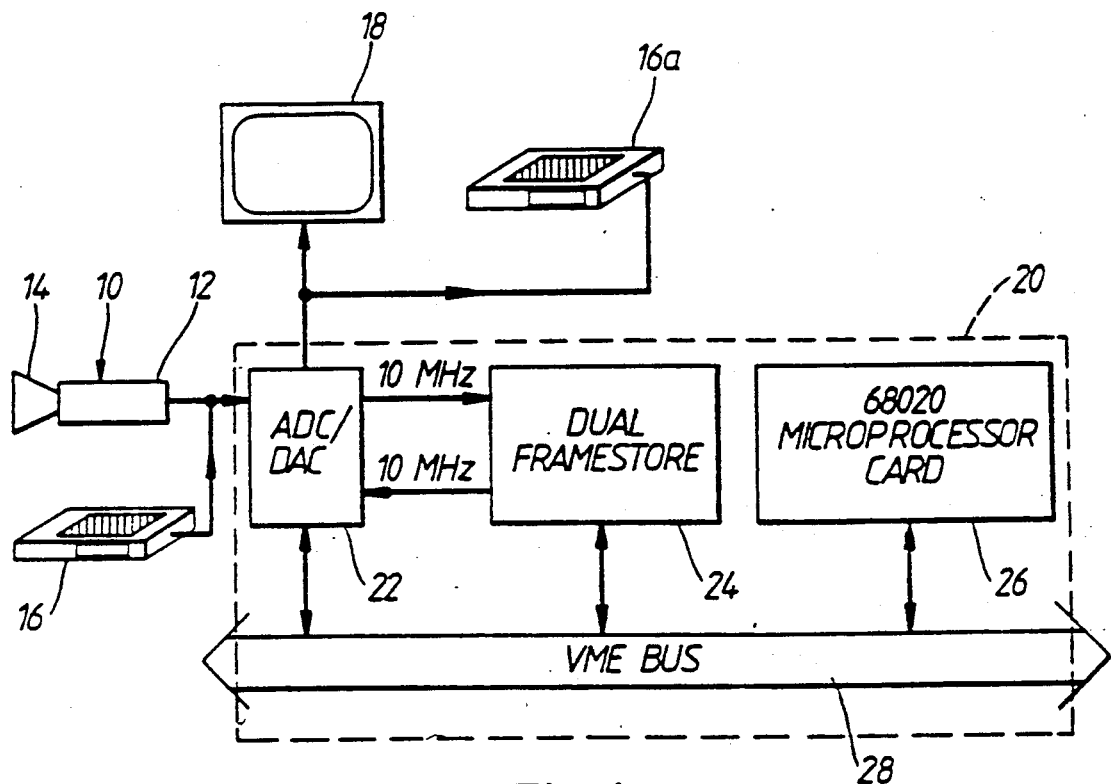
FIG. 1 is a block schematic diagram of a stabilisation unit according to the present invention.

Referring to the drawings, an electronic image sensor 10 comprises a video camera 12 having a lens 14. The camera may be connected in known manner to a video recorder 16 or 16a and to a monitor 18. The camera may be hand held and, consequently, subject to pointing instability.

In accordance with the present invention, the video data derived from the camera 12 (or subsequently from the recorder 16) is electronically stabilised. To this end, the video data from the camera 12, in real time, or from the recorder 16 is passed to an image processor 20. The image processor 20 comprises an analogue-to-digital-converter (ADC) and a digital-to analogue-converter (DAC) module 22 which serves to convert incoming video data to digital form. The resolution of the ADC may be 8, 12 or more bits depending upon the size of a subsequent framestore and the processing power of the module 22. However, it has been found that 8 bit resolution suffices to achieve the electronic image stabilisation of the present invention. The converter, clocked at 10 MHz is fast enough to pixelise each video frame, in real time, to give horizontal and vertical resolution of 512 pixels per frame i.e. a total 262,144 pixels.

A framestore 24 is provided. The framestore is capable of storing at least two frames of video data in digital form i.e. a memory capacity of at least 0.5M byte.

The image processor 20 also includes a microprocessor 26 capable of performing the desired processing of the information stored in the framestore. The converter module 22, the framestore 24 and the microprocessor 26 are all connected by a VMEbus 28.

Figure 2:
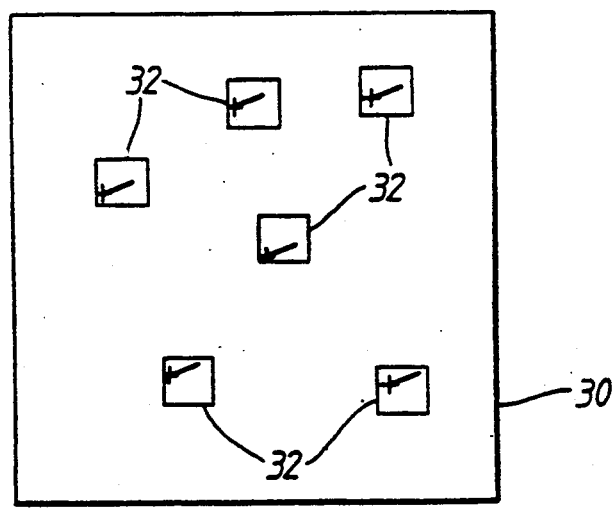
FIG. 2 is an illustration of a video frame diagrammatically indicating electronic image stabilisation in accordance with the present invention.

Referring to FIG. 2, there is seen, diagrammatically illustrated, a frame 30 of video data. The frame 30 has windows 32 therein. Six windows 32 are shown. There may be more or less than six depending on the processing power of image processor. Each window defines a square of pixels e.g. 16×16 or 32×32. The location of the windows 32 may be predetermined or may be user selectable.

In the simplest form of processing, the microprocessor 26 is arranged to select the most intense pixel (the hot spot) in each of the windows 32. Thereafter, the windows may be substantially centred automatically thereon. A comparison is then made between the windows of a first frame an a next succeeding frame and a consensus of the movement of the respective hot spots determined. If any horizontal or vertical common movement of the pixels is discerned, it is assumed that this is due to unintentional camera movement. The frame 30 is then remapped according to the vector associated with the common movement of the hot spots to cancel the vector. It is possible to discern also rotational movement of the camera in this way and, again, appropriate remapping of the pixels of the frame 30 may be effected to counteract (to cancel) such rotational movement. A net result of such electronic stabilisation is that blank bands may appear at the top, bottom or sides of a picture viewed on a monitor when the video data has been electronically stabilised in this way. If the camera were mounted on a motorised platform, feedback could be provided to counteract the displacement of the remapped video data on the screen.

The remapped video data is fed from the frame store 24 to the converter module 22 wherein it is reconverted to analogue information. The digital to analogue converter may include an interpolator to smooth the reconverted signal which is then fed to the monitor 18 and/or to a video recorder 34.

The simplest form of image processing described above may be enhanced if a comparison is made between succeeding frames 30 not only of the most intense pixel (the hot spot) of each window 32 but also of the intensity of the surrounding pixels thereto. Such processing avoids the error occasioned by camera movement causing an equal or more intense pixel to enter a window 32.

A preferred form of image processing is that enabled by the corner-and-edge detection described in GB Specification No. 2,218,507 our co-pending patent appplicatin no. 8811223 filed in the United Kingdom on May 12 1988 and entitled "Digital Data Processing".

The image processing described therein enables detection of sharp intensity variations between adjacent pixels. Detection of corners or edges is much more accurate than merely tracking hot spots or even hot spots and their surrounding pixel intensities.

The invention is not confined to the precise details of the foregoing examples and variations may be made thereto. For instance, it is possible to track a moving object and if desired, maintain the image thereof centrally of a monitor screen. In real time, a moving object will have a substantially constant velocity from frame to frame. A window centred on the object would give rise to substantially constant re-mapping on which may be superimposed re-mapping due to additional detected movement. For such tracking it may be necessary to provide a plurality of framestores (i.e. more than two). The vector applied in re-mapping could also be applied to a motorised platform for a camera to cause the camera to track the object.

Any video sensor, including a miniature lightweight TV camera, may have its output stabilised in this way. Similarly recorded video data can be played back through the image processor 20 and stabilised.

As stabilisation is performed in real time, any sensor pointing instability up to a frequency of 12.5 Hz may be totally eliminated (15 Hz at a frame rate of 30 frames/second). Higher frequency instability is also ameliorated.

Other variations are possible within the scope of the present invention as defined in the appended claims.

We claim:

1. An electronic image stabilisation apparatus comprising converter means for digitising a video signal to be stabilised, a framestore for storing digital information relating to a first and at least a second succeeding frame, window defining means for defining windows, means for identifying the location of at least one specific pixel within each window, means for comparing the location of the at least one specific pixel in the first frame with the location thereof in the second succeeding frame and for remapping the second frame to cancel a detected movement vector.

2. An apparatus as claimed in claim 1 wherein the converter means comprises an analogue to digital converter for digitising a video signal and also a digital to analogue converter for re-converting the digital remapped frame to an analogue video region.

3. An apparatus as claimed in claim 1 wherein the window defining means defines as least six windows, each of said at least six windows having a selectable location.

4. An apparatus as claimed in claim 1 wherein said identifying means serves to identify, in each window that pixel having a highest intensity value.

5. An apparatus as claimed in claim 4 wherein said identifying means serves also to identify the pixels surrounding each highest intensity value pixel.

6. An apparatus as claimed in claim 1 wherein said identifying means serves to identify, within the or each window, that or those pixels having a sharp change in intensity from one or more adjacent pixels.

7. An apparatus as claimed in claim 1 wherein the or each window is of size equal to a number of pixels squared.

8. A method of electronic image stabilisation comprising the steps of digitising an analog video signal into pixels, defining within each frame at least one window, storing the value and location of at least one pixel within the window of a first frame, comparing the position of the at least one pixel in a next succeeding frame with the stored value, and re-mapping the next succeeding frame to cancel a vector defining detected movement between the pixel locations.

9. A method as claimed in claim 10 wherein the at least one pixel is determined by selecting that pixel within the window having the highest intensity value.

10. A method as claimed in claim 8 wherein the or each window is of size a number of pixels squared and including the step of redefining the or each window so that the at least one pixel is substantially centrally disposed in the window.

11. A method as claimed in claim 8 wherein at least six windows are defined, the windows being positioned within the frame under manual control.

12. A method as claimed in claim 8 wherein the at least one pixel is selected on basis of greatest difference in intensity between two or more adjacent pixels.

* * * * *